2,773,913
Patented Dec. 11, 1956

2,773,913

FLUORINATING ORGANIC COMPOUNDS WITH HYDROGEN FLUORIDE CONTAINING HYDROXONIUM IONS

Dieter Goerrig, Lohmar, and Heinz Jonas, Leverkusen-Wiesdorf, Germany, assignors to Farbenfabriken Bayer Aktiengesellschaft, Leverkusen, Germany, a corporation of Germany No Drawing. Application October 6, 1953,
Serial No. 384,506

Claims priority, application Germany October 8, 1952

6 Claims. (Cl. 260—653)

This invention relates to a process of producing organic compounds containing fluorine by the addition of hydrogen fluoride to unsaturated organic compounds.

Many unsaturated organic compounds, for instance ethylene, acetylenes and their halogeno substitution products, can be converted into the corresponding saturated compounds by chemically adding hydrogen fluoride under suitable conditions.

In the case of some substances—especially olefinic carboxylic acids—the use of an approximately 40% aqueous hydrofluoric acid or a polyfluoride melt suffices for carrying out the reaction, but in most cases substantially anhydrous hydrogen fluoride is required. The reaction is carried out either in the gaseous phase—in the presence of solid catalysts, for instance when acetylene is employed—or in the liquid phase, preferably under pressure at raised temperature. Substances which do not react with hydrogen fluoride under these conditions (for instance trichloroethylene, perchloroethylene and difluorodichloroethylene), can be reacted with anhydrous hydrogen fluoride as described by Henne, though with difficulty, by addition of relatively large quantities of boron fluoride.

In accordance with the present invention hydrogen fluoride and unsaturated organic compounds, especially halogenated ethylenes and acetylenes, are reacted in the presence of more than 0.1 mol/percent, preferably 0.3–5 mol/percent, of compounds containing oxygen which are capable of yielding, in hydrogen-fluoride as solvent, hydroxonium ions or oxygen-containing cations that may be regarded as substituted hydroxonium ions, preferably in the presence of a mercury compound, for instance mercuric chloride.

Whereas it has been the general belief that hydrogen fluoride as anhydrous as possible, if necessary with the addition of boron fluoride, is most suitable for carrying out the addition reaction, it has now surprisingly been found that a water content of some percent calculated on the hydrogen fluoride employed strongly accelerates the reaction. Substances which, under the reaction conditions in hydrogen fluoride as solvent, yield oxygen-containing cations that may be regarded as substituted hydroxonium ions or which react with hydrogen fluoride with the formation of hydroxonium ions, for instance metallic oxides and hydroxides, oxygen acids and acid anhydrides, organic hydroxy, keto and hydroxyketo compounds and their derivatives, show similar catalytic activity. Mercury salts, for instance mercuric chloride, increase the reaction velocity of hydrogen fluoride.

It has further been found that ansolvo acids such as the fluorides of boron, titanium, phosphorus, sulfur, arsenic and antimony, or thionyl fluoride or sulfuryl fluoride, added apart from the above acid substances, induce a considerable increase of the reaction velocity, especially when these substances are present besides hydroxonium ions in a definite proportion. In general the proportion of the central atom of these ansolvo acids to total oxygen present should correspond to the oxide of the central atom (for instance $BF_3:H_2O=2:3$, corresponding to $B_2O_3$).

According to the invention the said catalysts, for instance $BF_3-H_2O-HgCl_2$, offer the possibility of smoothly carrying out the addition of hydrogen fluoride to compounds which cannot or can only with difficulty be caused to add on hydrogen fluoride by the previously known processes, for instance trichloroethylene, perchloroethylene and fluorochloroethylene. In the case of other substances, which can be reacted to give addition products by prior art processes but simultaneously undergo decomposition reactions (for instance asymmetrical dichloroethylene), the said catalysts enable the reaction to be carried out so mildly that the decompositions are almost completely suppressed. For instance on addition of HF to $C_2HCl_3$ by the process of the invention yields of more than 90% are obtained, whereas the previously known processes carried out in the presence of 20 times the quantity of the catalyst (Henne, J. Am. Chem. Soc. 70, pages 758–760), give a yield of only 60%. The quantity of hydroxonium catalyst to be employed in the herein described process ranges between 0.1 and 10 mol/percent; preferably a quantity between 0.3 and 5 mol/percent is employed. The quantity depends in an individual case upon the reactivity of the system, the reaction temperature and, where two liquid phases are concerned, on the intensity of the mixing operation. The catalyst is preferably employed in quantities which ensure a substantially complete reaction under the reaction conditions within 12–48 hours. The molar ratio of ansolvo acid and oxygen-containing compounds, for instance boron fluoride and water, is adjusted in simple manner so that the oxide, for instance $B_2O_3$, is dissolved in substantially anhydrous hydrogen fluoride. The mercury chloride is preferably dissolved in the organic compound employed.

The invention is further illustrated by the following examples:

Example 1

A solution of 60 grams of $HgCl_2$ (0.22 mol) in 12.3 litres = 18 kg. (137 mols) of trichloroethylene is filled into a steel autoclave. Thereupon a solution of 45 grams (0.65 mol) of boron oxide in 3 kg. (150 mols) of hydrogen fluoride (99.8–99.95%) is added. The autoclave is slowly heated to 130–135° C. within 2 hours and kept at this temperature while a condenser mounted on the autoclave is adjusted to a temperature of 60–70° C. The continuous boiling ensures sufficiently intense mixing so that additional agitation by mechanical means may be omitted. After about 22 hours the autoclave is cooled and its contents worked up.

The working pressure is about 40 atmospheres.

After working up there are obtained about 15.0 kg. $C_2H_2FCl_3$, about 1.5 kg. $C_2HCl_3$, about 0.3 kg. $C_2H_2F_2Cl_2$.

Example 2

60 grams of $HgCl_2$ (0.22 mol) are fed into an autoclave and a solution of 45 grams of $B_2O_3$ (0.65 mol) in 3 kg. of hydrogen fluoride (99.8–99.95%; 150 mols) is added. After removing the air the autoclave is heated to about 60° C.; the temperature of the cooling water is about 10° C. lower.

15 kg. (155 mols) of freshly distilled asymmetrical dichloroethylene is added under pressure in the course of about 8 hours, the temperature being kept between 60 and 80° C. After addition of the dichloroethylene the reaction mixture is kept at 80° C. for about 4 hours, The working pressure is 5–10 atmospheres.

After working up about 14.5 kg. (a yield of 80% of the theoretical) of 1-fluoro-1.1-dichloroethane are obtained besides a very small quantity of substitution products, such as 1.1-difluoro-1-chloroethane, and a very small quantity of unreacted dichloroethylene.

We claim:

1. In the process for the production of fluorochloroethane by the addition of hydrogen fluoride to trichloroethylene the step which comprises autoclaving at a temperature of 130–135° C. and a pressure of about 40 atmospheres for a period of 22 hours a reaction mixture consisting of 18 kg. of trichloroethylene, 60 g. of $HgCl_2$, 3 kg. of hydrogen fluoride and 45 grams of boron oxide, and recovering $C_2H_2FCl_3$.

2. In the process for the production of fluorochloroethane by the addition of hydrogen fluoride to asymmetrical dichloroethylene the step which comprises autoclaving at a temperature of 80° C. and a pressure of 5–10 atmospheres for a period of about 4 hours a reaction mixture consisting of 15 kg. of asymmetrical dichloroethylene, 60 grams of $HgCl_2$, 3 kg. of hydrogen fluoride, 45 grams of $B_2O_3$ and recovering $CH_3CFCl_2$.

3. In a process for the production of organic compounds containing fluorine by the addition of hydrogen fluoride to unsaturated compounds, the improvement which comprises effecting the reaction in the presence of hydroxonium ions formed in situ by reaction of hydrogen fluoride with about 0.1–10 mol% of an oxygen-containing compound selected from the group consisting of water, metallic oxides, metallic hydroxides, oxygen acids, acid anhydrides, organic hydroxy keto and hydroketo compounds yielding under the reaction conditions in hydrogen fluoride as solvent, oxygen-containing cations, and in the additional presence of a stoichiometric quantity of an ansolvo acid selected from the group consisting of boron fluoride, titanium fluoride, phosphorus fluoride, arsenic fluoride, antimony fluoride, thionyl fluoride and sulfuryl fluoride.

4. Process according to claim 3, in which said oxygen-containing compound is used in amount of about 0.3–5 mol percent.

5. Improvement according to claim 4, in which the reaction is effected in the additional presence of a mercury salt as a catalyst.

6. Process according to claim 4, in which both said oxygen-containing compound and said stoichiometric quantity of said ansolvo acid are formed in situ by dissolving boron oxide in said hydrogen fluoride.

References Cited in the file of this patent

UNITED STATES PATENTS

| | | |
|---|---|---|
| 2,343,252 | Benning | Mar. 7, 1944 |
| 2,425,991 | Burk | Aug. 19, 1947 |
| 2,437,993 | Benning et al. | Mar. 16, 1948 |
| 2,560,838 | Arnold | July 17, 1951 |
| 2,562,547 | Hanford et al. | July 31, 1951 |
| 2,658,927 | Kwasnik | Nov. 10, 1953 |
| 2,669,590 | Miller et al. | Feb. 16, 1954 |